United States Patent [19]

Large

[11] Patent Number: 5,170,275
[45] Date of Patent: Dec. 8, 1992

[54] OPTICAL MIXING FOR HETERODYNE DETECTION

[75] Inventor: Timothy A. Large, Papworth Everard, Great Britain

[73] Assignee: Northern Telecom Limited, Montreal, Canada

[21] Appl. No.: 715,509

[22] Filed: Jun. 14, 1991

[30] Foreign Application Priority Data

Jun. 14, 1990 [GB] United Kingdom ............... 9013263

[51] Int. Cl.⁵ .................................... H04B 10/06
[52] U.S. Cl. ..................................... 359/192; 359/189
[58] Field of Search ............... 359/189, 191, 192, 193, 359/195, 156

[56] References Cited

U.S. PATENT DOCUMENTS

| | | | |
|---|---|---|---|
| 4,718,120 | 1/1988 | Tzeng | 359/193 |
| 4,723,317 | 2/1988 | Glance | 359/193 |
| 4,958,918 | 9/1990 | Walker | 359/189 |
| 5,027,436 | 6/1991 | Delavaux | 359/189 |

*Primary Examiner*—Edward L. Coles, Sr.
*Assistant Examiner*—Kinfe-Michael Negash
*Attorney, Agent, or Firm*—Lee, Mann, Smith, McWilliams, Sweeney & Ohlson

[57] ABSTRACT

A transmitted (TX) signal received from the remote location is mixed in a polarization resolving beam splitter (10) with a local oscillator (LO) signal from a laser (15). The LO and TX signal components emerging from the beam splitter (10) are orthogonally polarized, but their polarization states are brought into alignment by passage through two birefringent elements (19, 20) before falling on two photodetectors (17, 18). Adjustment of a polarization controller (16) ensures that approximately equal LO power falls on each photodetector.

16 Claims, 1 Drawing Sheet

OPTICAL MIXING FOR HETERODYNE DETECTION

BACKGROUND OF THE INVENTION

This invention relates to optical mixing for heterodyne detection, and in particular to a form of mixing that is insensitive to differences between the state of polarisation (SOP) of the received transmitted (TX) signal and that of the local oscillator (LO) signal with which the (TX) signal is being heterodyned.

A form of such detection is known from the paper by L. D. Tzeng et al entitled "Polarization—insensitive coherent receiver using a double balanced optical hybrid system", TU 12, Proc. OFC '88 Tuesday Afternoon/32. The Tzeng et al optical mixer employs a single polarisation insensitive 3 db fibre coupler, two polarisation resolving beam splitters and two polarisation controllers to provide four optical outputs for detection by two balanced pairs of detectors.

SUMMARY OF THE INVENTION

A primary object of the present invention is to achieve polarisation-insensitive heterodyne optical mixing with a reduced component count.

According to the present invention there is provided an optical mixer for heterodyne detection of a transmitted (TX) signal of a first optical frequency received from a remote location, the mixer employing a local oscillator (LO) signal of a second optical frequency different from the first, which mixer includes a polarisation resolving beam splitter with a pair of input ports and a pair of output ports, which output ports are respectively optically coupled with a pair of birefringent elements, wherein the birefringence of each of the birefringent elements is such that the component of a TX signal launched into one of the input ports of the polarisation resolving beam splitter which enters that element, and the component of an LO signal launched into the other input port of the beam splitter which enters that element, emerge from that element with substantially matching SOP's.

The invention also provides a polarisation insensitive heterodyne optical receiver adapted to mix a transmitted (TX) signal of a first optical frequency received from a remote location with a local oscillator (LO) signal of a second frequency different from the first, which receiver includes a polarisation resolving beam splitter which has two input ports for the application thereto respectively of the TX and the LO signals, and two output ports, and has a pair of orthogonally related principal states of polarisation (SOP's) that are the SOP's respectively possessed by the signals separately appearing at the two output ports in response to the application of a signal to either one of the input ports, wherein the two output ports of the polarisation resolving beam splitter are respectively coupled via two birefringent elements to two photodetectors, wherein the orientation of each birefringent element is such that the representation of its eigenaxis on a Poincaré sphere is substantially orthogonal with respect to the axis of the sphere that passes through the points representing the principal SOP's of the polarisation resolving beam splitter, and wherein the length of each birefringent element is such that the TX and LO signals emerge from that element with substantially matching SOP's.

The invention further provides a method of optical heterodyne detection in which a transmitted (TX) signal of a first optical frequency received from a remote location is heterodyned with a local oscillator (LO) signal of a second frequency different from the first, wherein the TX and LO signals are applied to a polarisation resolving beam splitter which has two input ports and two output ports, and has a pair of orthogonally related principal states of polarisation (SOP's) that are the SOP's respectively possessed by the signals separately appearing at the two output ports in response to the application of a signal to either of the input ports, wherein the TX signal is applied to one of the input ports while the LO signal is applied to the other input port with an SOP which divides the LO signal substantially equally between the two outports, and wherein the resulting orthogonally polarised components of the TX and LO signals emerging from each output port are fed to a photodetector associated with that output port via an associated birefringent element wherein the orientation of each birefringement element is such that the representation of its eigenaxis on a Poincaré sphere is substantially orthogonal with respect to the axis of the sphere that passes through the points representing the principal SOP's of the polarisation resolving beam splitter, and wherein the length of each birefringent element is such that the orthogonally polarised TX and LO signal components entering that birefringent element emerge from the element with substantially matching SOP's.

The present invention disclosed how polarisation-insensitive heterodyne optical mixing may be achieved using two birefringent elements and only a single beam splitter, that beam splitter being of the polarisation resolving kind.

BRIEF DESCRIPTION OF THE DRAWINGS

There follows a description of optical polarisation insensitive mixing for heterodyne detection embodying the invention in a preferred form. The description refers to the accompanying drawings in which.

DETAILED DESCRIPTION OF THE PREFERRED EMBODIMENTS

Figure 1:
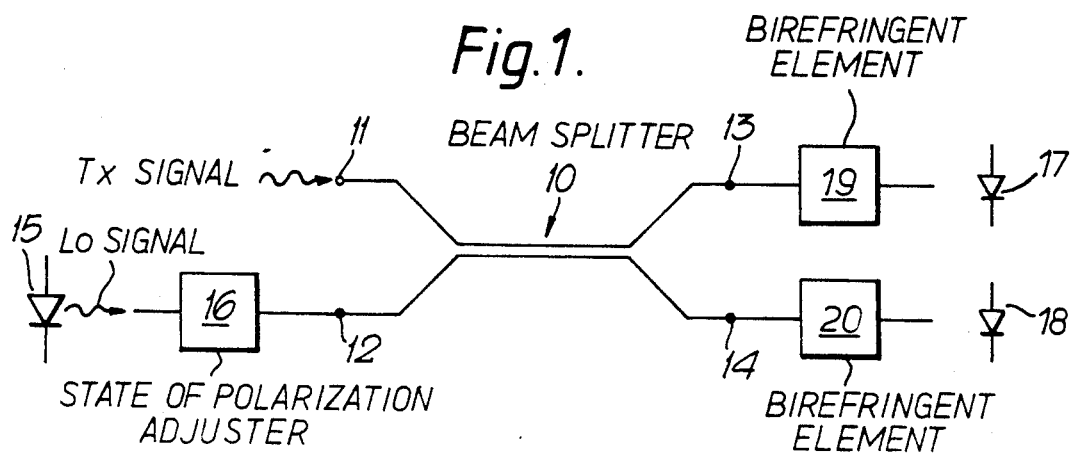
FIG. 1 is a block diagram of the optical mixer, the local oscillator and a pair of detectors.

Referring to FIG. 1, a polarisation resolving beam splitter 10, having two input ports 11, 12 and two output ports, 13, 14, has its input port 11 connected to receive from a remote location the transmitted (TX) signal to be coherently detected. Input port 12 is connected to receive a local oscillator (LO) signal from a laser 15 by way of a state of polarisation (SOP) adjustor 16. The beam splitter 10 resolves any light applied to either input port into two orthogonally polarised components respectively leaving the beam splitter by way of its output ports 13 and 14. These two polarisation states are the principal polarisation states of the beam splitter. The beam splitter 10 is conveniently a tapered fused optical fibre beam splitter, typically one constructed from polarisation maintaining high birefringence fibre. The polarisation adjuster, which may be constituted by one or more loops of standard circularly symmetric single mode optical fibre, is adjusted so that the optical power from the laser 15 is divided substantially equally between the two output ports 13 and 14.

The LO component appearing at output port 13 is orthogonally polarised with respect to the LO component appearing at output port 14, and similarly the two TX components are orthogonally polarised with respect to each other. This is the primary function of a polarisation resolving beam splitter. Additionally the LO component appearing at output port 13 is orthogonally polarised with respect to the TX appearing at this output port. This is because the two components are derived from signals launched into opposite input ports. For the same reason the LO and TX components appearing at output port 14 are orthogonally polarised. Output ports 13 and 14 are respectively optically coupled with a matched pair of photodetectors 17 and 18, but there is not point in making a straighforward direct connection since orthogonally polarised components do not interfere. It is necessary in each case to provide a differential adjustment of the SOP's of the LO and TX components to bring the pair of them to substantially the same OP. These differential adjustment are made by connecting their output ports 13 and 14 to their respective photodiodes 17 and 18 via birefringent elements 19 and 20.

Figure 2:
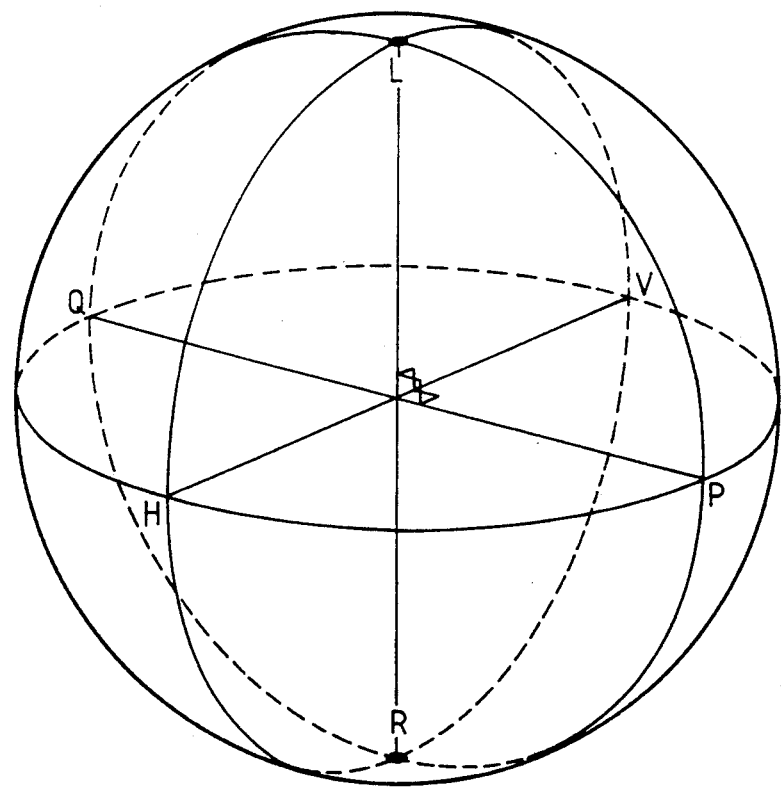
FIG. 2 is a Poincaré sphere diagram.

On the Poincaré sphere of FIG. 2 the locus of all possible linear polarised states is given by the equatorial great circle through HQV and P, while the left-handed and right-handed circularly polarised states are represented respectively by the two poles L and R. In its passage through a birefringent element, the SOP of light evolves in a way that is represented on a Poincaré sphere as a rotation about an axis of the sphere passing through the eigenstates of that birefringent element. The eigenstates are the two orthogonally polarised states which are transmitted through the element without change of SOP. The light of any given wavelength propagating through any particular birefringent element is equal to the phase difference introduced by the element between light of that wavelength propagating through the element with its SOP coincident with one eigenstate and that propagating with its SOP coincident with the other eigenstate. The rotation thus depends upon the thickness (length) of the element, upon the strength of its birefringence, and upon the wavelength of the light. In the case of a uniaxial element of thickness 'd', the optical path length of the element is $n_E d$ for light of one of the principal SOP's (eigenstates), and is $n_o d$ for light of the other. The optical path difference is thus $(n_E - n_o)d$ and the optical phase difference is $2\pi(n_E - n_o)d/\lambda$. In the case of a typical uniaxial crystal $(n_E - n_o)$ is only weakly dependent upon wavelength, and hence over typical operating wavelength ranges this wavelength dependence is too small to be significant, with the result that the phase difference, and hence rotation on the Poincaré sphere, is effectively inversely proportional to wavelength.

The two principal SOP's of the polarisation resolving beam splitter 10 are orthogonally polarised linear polarisation states. Without any loss of generality, these two principle SOP's can be represented by the points P and Q on the Poincaré sphere of FIG. 2. If the birefringent elements 19 and 20 are to be capable of causing the SOP's corresponding to points P and Q to evolve to a position where they have the same SOP, it is clear that the eigenaxes of those elements must lie in the plane containing LVR and H so that the evolution is around a great circle through P and Q. In the case of birefringent elements that are linearly birefringent (i.e. their eigenstate SOP's are linear SOP's), the eigenstates must therefore correspond to the points H and V. These elements may conveniently be constituted by lengths of high birefringence polarisation maintaining fibre. If the beam splitter 10 is also made from polarisation maintaining fibre, the appropriate relative orientation between the principal SOP's of the beam splitter and the eigenstates of the lengths of fibre constituting the birefringence elements is obtained by splicing the birefringence element fibres to the respective output ports of the beam splitter 10 with the principal polarisation planes of the birefringence element fibres at 45° to the corresponding planes of the fibres of the output ports of the beam splitter.

When light is launched from one of the output ports of the beam splitter 10 into its associated linear birefringence element, the SOP's of the LO component and the TX component both evolve around the same great circle through PLQ and R. The SOP's of the two components start at the diametrically opposed points P and Q but, as a consequence of their slightly different wavelengths, the two rates of evolution are slightly different, with the result that the one eventually catches up with the other, and they come into step. Just how long a length of high birefringence fibre is required to produce this 'catching-up' effect depends upon the strength of birefringence of the fibre and the relationship between the LO and TX wavelengths and frequencies.

The strength of the birefringence of high birefringence fibre is often expressed in terms of its beat length, where a beat length is the length of fibre providing one wavelength optical path difference for light propagating in the two principal planes of the fibre. The strength of birefringence exhibits the same form of wavelength dependency as a typical uniaxial crystal, and so the beat length, B, of a particular fibre is proportional to wavelength, $\lambda$, $$B = k\lambda,$$

where k is a constant of proportionality characterising the strength of birefringence of that fibre.

The SOP's of the LO and TX components will be in step with each other when the number of beat lengths, x, for the LO component differs by half a beat length from that for the TX component. (x is not necessarily an integral number, and in general will not be). If there are x beat lengths $B_1$ at a frequency $f_1$ and wavelength $\lambda_1$, in a physical length d of fibre, and $(x+\frac{1}{2})$ beat lengths $B_2$ at a frequency $f_2$ and wavelength $\lambda_2$ in the same fibre, then $$d = xB_1 = xk\lambda_1 = xkc/f_1 \text{ and}$$
$$d = (x+\tfrac{1}{2})B_2 = (x+\tfrac{1}{2})k\lambda_2 = (x+\tfrac{1}{2})kc/f_2$$

where c is the velocity of light.
Therefore $$(f_1 - f_2) = xkc/d - (x+\tfrac{1}{2})kc/d \text{ and}$$
$$d = kc/2(f_2 - f_1)$$

Thus for fibre with a beat length of about 1 mm at a wavelength of 1.5 μm, the required length of fibre to being LO and Tx, separated in frequency by 10 GHz, to the same SOP is about 100 m.

As an alternative to the use of elements exhibiting linear birefringence for the elements 19 and 20 of FIG. 1, it is clear from the Poincaré sphere of FIG. 2 that in principle it is possible to use elements within eigenstates registering with the L and R poles of the sphere, that is elements exhibiting circular birefringence (optical activity). Circular birefringence may for instance be induced in standard circularly symmetric single mode fibre by twisting it. The practicality of using this type of birefringence in any particular set of circumstances depends upon obtaining a sufficiently short beat length coupled with a sufficient wavelength dependency.

I claim:

1. An optical mixer for heterodyne detection of a transmitted (TX) signal of a first optical frequency received from a remote location, the mixer employing a local oscillator (LO) signal of a second optical frequency different from the first, which mixer includes a polarisation resolving beam splitter with a pair of input ports and a pair of output ports which output ports are respectively optically coupled with a pair of birefringent elements, wherein the birefringence of each of the birefringent element is such that the component of a TX signal launched into one of the input ports of the polarisation resolving beam splitter which enters that element, and the component of an LO signal launched into the other input port of the beam splitter which enters that element, emerge from that element with substantially matching SOP's.

2. An optical mixer for heterodyne detection of a transmitted (TX) signal of a first optical frequency received from a remote location, the mixer employing a local oscillator (LO) signal of a second optical frequency different from the first, which optical mixer includes a polarisation resolving beam splitter with a pair of input ports for the application thereto respectively of the TX and LO signals, and a pair of output ports, and has a pair of orthogonally related principal states of polarisation (SOP's) that are the SOP's respectively possessed by the signals separately appearing at the two output ports in response to the application of a signal to either one of the input ports, wherein the two output ports are optically coupled with respective birefringent elements, wherein the orientation of each birefringent element is such that the representation of its eigenaxis on a Poincaré sphere is substantially orthogonal with respect to the axis of the sphere that passes through the points representing the principal SOP's of the polarisation resolving beam splitter, and wherein the length of each birefringent element is such that the TX and LO signals emerge from that element with substantially matching SOP's.

3. An optical mixer as claimed in claim 2, wherein the polarisation resolving beam splitter is a tapered fused optical fibre beam splitter.

4. An optical mixer as claimed in claim 3, wherein the beam splitter is constructed from polarisation maintaining optical fibre.

5. An optical mixer a claimed in claim 3, wherein each birefringent element is constituted by an optical fibre.

6. An optical mixer as claimed in claim 5, wherein each birefringent element is constituted by a linearly birefringent polarisation maintaining optical fibre.

7. A polarisation insensitive heterodyne optical receiver adapted to mix a transmitted (TX) signal of a first optical frequency received from a remote location with a local oscillator (LO) signal of a second frequency different from the first, which receiver includes a polarisation resolving beam splitter which has to input ports, for the application thereto respectively of the TX and LO signals, and two output ports, and has a pair of orthogonally related principal states of polarisation (SOP's) that are the SOP's respectively possessed by the signals separately appearing at the two output ports in response to the application of a signal to either one of the input ports, wherein the two output ports of the polarisation resolving beam splitter are respectively coupled via two birefringent element to two photodetectors, wherein the orientation of each birefringent element is such that the representation of its eigenaxis on a Poincaré sphere is substantially orthogonal with respect to the axis of the sphere that passes through the points representing the principal SOP's of the polarisation resolving beam splitter, and wherein the length of each birefringent element is such that the TX and LO signals emerge from that element with substantially matching SOP's.

8. An optical receiver as claimed in claim 7, wherein the polarisation resolving beam splitter is a tapered fused optical fibre beam splitter.

9. An optical receiver as claimed in claim 8, wherein the beam splitter is constructed from polarisation maintaining optical fibre.

10. An optical receiver as claimed in claim 8, wherein the respective birefringent elements are optical fibres.

11. An optical receiver as claimed in claim 10, wherein the respective birefringent elements are linearly birefringent polarisation maintaining optical fibres.

12. A method of optical heterodyne detection in which a transmitted (TX) signal of a first optical frequency received from a remote location is heterodyned with a local oscillator (LO) signal of a second frequency different from the first, wherein the TX and LO signals are applied to a polarisation resolving beam splitter which has two input ports and two output ports, and has a pair of orthogonally related principal states of polarisation (SOP's) that are the SOP's respectively possessed by the signals separately appearing at the two output ports in response to the application of a signal to either of the input ports, wherein the TX signal is applied to one of the input ports while the LO signal is applied to the other input port with an SOP which divides the LO signal substantially equally between the two outports, and wherein the resulting orthogonally polarised components of the TX and LO signals emerging from each output port are fed to a photodetector associated with that output port via an associated birefringent element wherein the orientation of each birefringement element is such that the representation of its eigenaxis on a Poincaré sphere is substantially orthogonal with respect to the axis of the sphere that passes through the points representing the principal SOP's of the polarisation resolving beam splitter, and wherein the length of each birefringent element is such that the orthogonally polarised TX and LO signal components entering that birefringent element emerge from the element with substantially matching SOP's.

13. A method of optical heterodyne detection as claimed in claim 12, wherein the TX and LO signals are applied to a polarisation resolving beam splitter which is a tapered fused optical fibre beam splitter.

14. A method of optical heterodyne detection as claimed in claim 12, wherein the TX and LO signals are applied to a polarisation resolving beam splitter constructed from polarisation maintaining optical fibre.

15. A method of optical heterodyne detection as claimed in claim 13, wherein the orthogonally polarised components of the TX and LO signals emerging from the output ports of the beam splitter are fed to their associated photodetectors via birefringent elements that are optical fibres.

16. A method of optical heterodyne detection as claimed in claim 13, wherein the orthogonally polarised components of the TX and LO signals emerging from the output port of the beam splitter are fed to their associated photodetectors via birefringent elements that are linearly birefringent polarisation maintaining optical fibres.

* * * * *